3,510,269
PREPARATION OF SHAPED ALKALI METAL PERBORATE TETRAHYDRATE

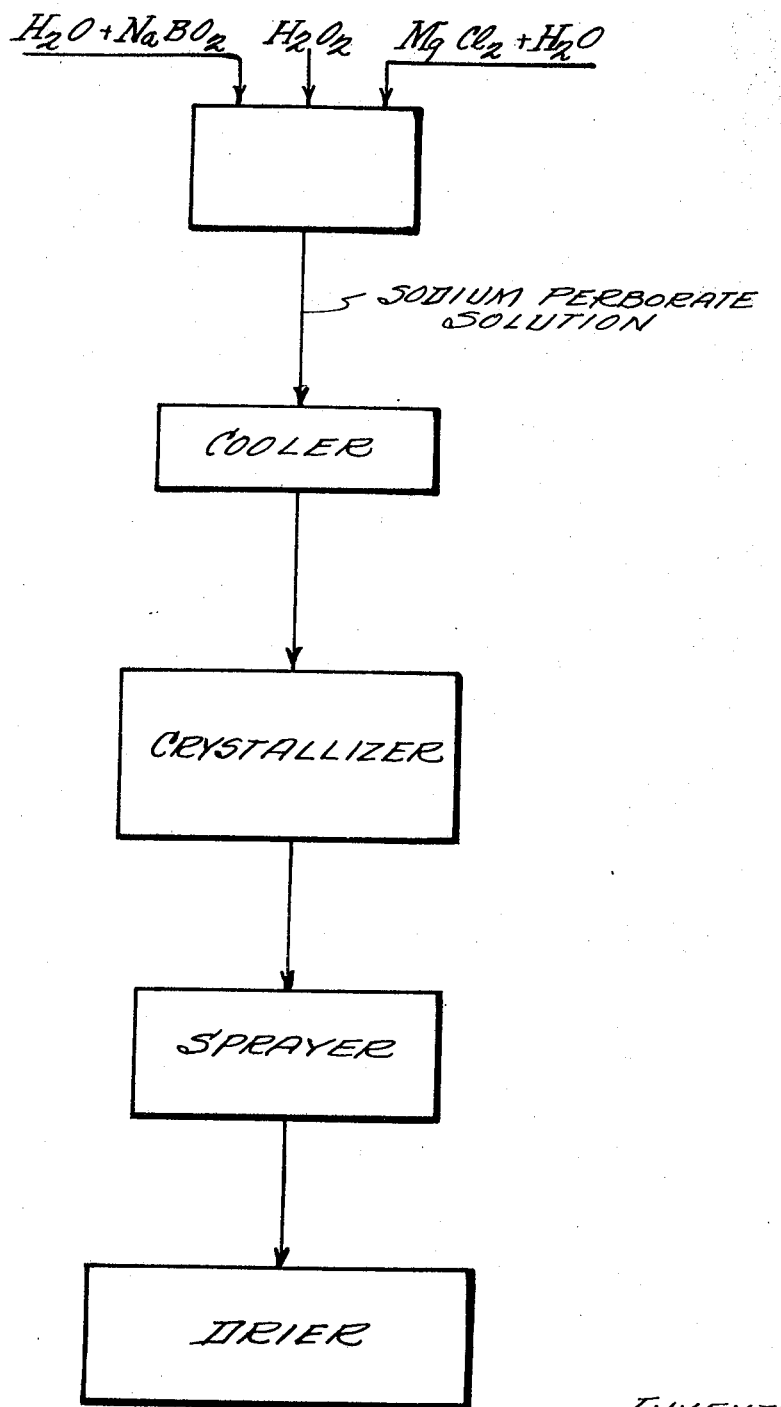

Friedrich Bittner, Bad Soden, Taunus, Edmund Simmersbach, Willaringen-Egg, Kries, Sackingen, Franz Ludwig Dahm, Beuggen, Gemeinde Karsau, and Artur Schaller, Rheinfelden, Baden, Germany, assignors to Deutsche Gold- und Silber - Scheideanstalt vormals Roessler, Frankfurt am Main, Germany
Filed Sept. 19, 1966, Ser. No. 580,164
Claims priority, application Germany, Sept. 17, 1965, D 48,231
Int. Cl. B01d 9/02; B01b 15/12
U.S. Cl. 23—302     7 Claims

ABSTRACT OF THE DISCLOSURE

Alkali metal borate with low bulk density is produced from aqueous perborate solution by a process including the steps of shaping a highly viscous super-saturated aqueous alkali metal perborate solution, inducing partial crystallization of the perborate, permitting the crystallization of the shaped product to go to completion with occlusion of the water present in the solution and then drying. Preferably, magnesium chloride is added as a stabilizer to the solution.

---

The invention concerns an improved process for the production of shaped alkali metal perborate products, especially, granulated alkali metal perborates which are of low bulk density and are rapidly soluble in water.

Perborate granulates are marked by their low bulk density, free flowing properties as well as their rapid solubility. These properties are particularly advantageous in the production of washing compositions as such granulates can be better mixed with the remaining components of such compositions which also are relatively light and the danger of separation of the components in shipped packaged form is reduced or at least avoided to a substantial degree. This requires that the perborate granulate has about the same bulk density and grain size distribution as the so-called tower powder. The rapid solubility of the perborate granulate is also of significance in laundering processes as otherwise undissolved or only slowly dissolving particles can lodge between the goods being washed and effect, in the most unfavorable instance, the formation of holes in the fabric adjacent thereto. The technical production of light perborate granulates, however, has hitherto been rather costly and requires several working steps. For example, a known process starts with dry perborate powder which is sprayed with a solution suitable for bonding such particles and then mixed in large containers. After the shaping the material is then again dried to the desired active oxygen content.

There has been no lack of endeavor to provide perborate powder which is sprayed with a solution suitable for bonding such particles and then mixed in large containers. After the shaping the material is then again dried to the desired active oxygen content.

There has been no lack of endeavor to provide perborate granulation processes which would avoid these additional working steps and to subject the perborate to a spray drying in such a way that a suited granulate is produced. It, however, was found that melts of perborate tetrahydrate even after dilution with various quantities of water when subjected to spray drying yield sticky, non-crystalline masses which stick to the walls of the spray tower and only crystallize throughout in the course of time. The spray drying of clear perborate melts therefore did not lead to the desired results.

The same is also true for the process according to German Pat. 337,058. Such process starts with very concentrated perborate solutions, which crystallize throughout by themselves, whereby the water of solution is enclosed in the crystals and therefore a solid perborate block is obtained. Such crystallization requires about 12 hours during which a considerable loss in active oxygen cannot be avoided. In order to shorten the time required for the crystallization it is recommended that it be effected under vacuum. However, the perborate which has hardened to a block always firmly adheres to the walls of the vessel in which it is formed so that its removal and comminution involve considerable difficulty. In addition, the mechanical forces applied during the comminution express a portion of the water occluded in the product so that the resulting granulates easily become smeary and the apparatus employed becomes encrusted. When attempts are made to avoid these disadvantages by drying the hardened perborate before its comminution, which in itself is rather time consuming because of the coarse crystallization of the perborate, the resultant comminuted product is a granulate containing a large proportion of fines which must be sieved off and in many instances is difficult to utilize. This discontinuous process has for these reasons not achieved acceptance as a commercially feasible process.

According to the present invention, it was unexpectedly found that perborate solutions contrary to all previous experiences can be sprayed and be shaped with the formation of granules if a highly viscous, supersaturated, preferably, stabilized perborate solution is partially crystallized before or during the shaping, preferably, granulation, and then permitting the remaining crystallization of the product to go to completion with occlusion of the water present and then drying the resultant solid product in a known manner. It is not necessary to effect simultaneous drying during the spraying as highly concentrated perborate solutions harden with occlusion of water to dry feeling granulates.

Various methods come into consideration for the partial crystallization of the concentrated perborate solutions according to the invention.

For example, the perborate solution which has been cooled to room temperature can be quickly brought to partial crystallization by mechanical stirring or by movement with air with or without application of a vacuum. An undesired complete crystallization can be prevented according to the invention by maintaining a temperature between 30 and 60° C. in the crystallizing vessel. At least a part of the heat required for this purpose can be covered by the heat of crystallization or it can be supplied from an external source, such as, for example, by steam heating.

A second way for the partial crystallization, for example, consists in introducing perborate dust into the highly concentrated perborate solution. A separate cooling is not necessary in this instance and the solution may have a temperature of about 55° C. This temperature is sufficient effectively to prevent premature complete crystallization of the entire concentrate and therefore solidification of the entire batch.

A special advantage of the process according to the invention is that the measures described above for the partial crystallization can easily be carried out continuously in that in the first instance an amount of cooled perborate solution is continuously supplied to the crystallization vessel which corresponds to the perborate paste drawn off from the crystallization and subsequently sprayed. In the second instance perborate solution and dust are supplied to the crystallizing vessel while stirring in the same quantity as the perborate paste which is withdrawn and sprayed.

A further advantageous method for effecting the partial crystallization is to spray the perborate concentrate in uncrystallized state and perborate dust is continuously blown into the spray cone. This procedure has the advantage that no crystallizing vessel is required and that the spray nozzle is only supplied with a crystal free perborate concentrate.

The spraying of the partially crystallized perborate solution according to the invention is preferably carried out by spraying such solution into the upper portion of an extended upright space and permitting it to fall downwardly therethrough. Preferably also the walls of such upright space are of an elastic material, for example, a synthetic resin sheet. The solidification occurs in the sprayed droplets by the further progress of the crystallization so that the agglomerates formed of semisolid particles when contacting the elastic walls continuously drop off of the wall, which is kept in suitable motion, upon a conveyor band and there harden completely with liberation of heat. The granulated product is then, for example, freed of its occluded water content in a fluidized bed in a normal manner and sieved and sacked.

It is not absolutely necessary that spraying be employed for shaping the partially crystallized perborate solution. It is, for example, possible to allow the perborate crystal paste to flow continuously onto a band or roller on which it is permitted to harden completely by completion of the crystallization. The hardened product is easily lifted off from such a base. In this embodiment, however, it can be necessary that the scales or fragments of the perborate are granulated, for example, with the aid of a 1 mm. sieve before they are finally crystallized and hardened.

A substantial advantage of the process according to the invention is that by the addition of varying quantities of water to the highly concentrated perborate solution it is possible to vary the porosity of the dried granules accordingly. As a result it is possible to adjust the bulk density of the product either high or low as desired. In addition, the porosity also increases the rate the product dissolves as the solvent can penetrate the pores and therefore can also act on the interior of the granules. However, the addition of water to the concentrated perborate solutions must be maintained within certain limits if the solidifying products are to be solid and not very moist. These relationships are indicated in the following Table I which gives the active oxygen (AO) content and the character of the product after solidification and the bulk density and active oxygen content after drying with respect to various quantities of excess water contained in the concentrate. The amount of excess water is that in excess of that required to satisfy the stoichiometric composition of the compound $NaBO_2.H_2O_2.3H_2O$ (sodium perborate tetrahydrate). As in each row the quantities of the $NaBO_2.H_2O_2.3H_2O$ and water add up to 100 g. the quantity of excess water in g. at the same time indicates the excess water content of the concentrate in percent.

ucts are hard to handle during the subsequent drying. Preferably, the excess water content is at least about 1 mol per mol of sodium perborate tetrahydrate.

It was found that completely colored granulates can be produced if the water added to the concentrated perborate solutions contains dyes.

The drawing is a schematic representation of the process as set forth in example 1.

The following examples will serve to illustrate the process of the invention.

EXAMPLE 1

104 liters of aqueous sodium metaborate solution, 39% at 70° C., 51.8 liters of aqueous $H_2O_2$ solution, 50% at 22° C. and 2 liters of an aqueous stabilizer solution (750 g. $MgCl_2.6H_2O$ per liter) per hour were simultaneously introduced into a reaction vessel of 10 liters capacity. The ensuing reaction heat was removed to such an extent that the temperature of the perborate solution continuously leaving the vessel was 56° C. The molar ratio of active oxygen to $Na_2O$ was 0.99:1.00. The solution contained 6.65% by weight (wt. percent) of active oxygen and therefore 35.4 wt. percent or 1.968 mol of water more than corresponding to the formula of sodium perborate tetrahydrate.

The perborate solution passed through a cooler and reached a 12 liter crystallizing vessel at a temperature of 30° C. Such vessel contained a perborate crystal paste which had been produced shortly before. The solution introduced was mixed with the perborate paste with vigorous stirring and thereby caused to crystallize partially. The heat of crystallization which was liberated heated the crystal paste and the wall of the crystallizing vessel were also simultaneously heated in order to prevent a too far reaching crystallization which could lead to a complete hardening of the crystal paste already in the crystallizing vessel. The heating of the walls of the vessel served to prevent formation of encrustations thereon.

A temperature of 52° C. was maintained in the crystallizing vessel. The crystal paste was continuously pumped out of the crystallizing vessel with the aid of a heated pump and supplied to the spray nozzle over a heated conduit and sprayed. 219.6 kg. per hour of crystal paste were drawn off from the crystallizing vessel, which is the same quantity as that of the crystal free solution which reached the crystallizing vessel during the same period of time.

The spraying was effected in a heated 2 material nozzle of usual construction. The perborate granulate sprinkled down from the spray tower walls to the conveyor band. The temperature of the granulate on the conveyor band was initially 20° C.; owing to the heat of crystallization it raised to 40° C. to 50° C. within half a minute. The perborate granulate contained 7 wt. per-

TABLE I

| Composition of the concentrate | | | AO of solidified product, percent | Character after solidification | Bulk density after drying, (g./l.) | AO after drying, percent |
|---|---|---|---|---|---|---|
| $NaBO_2.H_2O_2.$ $3H_2O$ (g.) | Excess water | | | | | |
| | G. | Mol | | | | |
| 76.8 | 23.2 | 1.29 | 7.99 | Very solid dry | 480 | 10.4 |
| 67.0 | 33.0 | 1.83 | 6.97 | Solid still dry | 350 | 10.4 |
| 57.3 | 42.7 | 2.37 | 5.96 | Solid slightly moist | 330 | 10.35 |
| 52.8 | 47.2 | 2.61 | 5.49 | Soft moist | 270 | 10.4 |
| 49.0 | 51.0 | 2.83 | 5.10 | Water partially removable on suction filter. | 240 | 10.35 |
| 40.0 | 60.0 | 3.33 | 4.16 | Filterable | 200 | 10.25 |

As can be seen from such table the character of the product after solidification of the highly concentrated perborate solution with rising water content alters in the direction that softer and moister products are obtained. It therefore is expedient not to go beyond an excess water content of 45% or about 2.5 mol excess water per mol of sodium perborate tetrahydrate, as the soft moist prodcent of active oxygen and hardened completely with liberation of heat before it reached the drier in which the occluded excess water (35.4 wt. percent) was removed. Thereafter the product was sieved and sacked. 142 kg. of dry product were obtained per hour. The sieved granulate had a bulk density of 380 g./liter, 10.3 wt. percent of active oxygen, a 35% pore volume and required a 3- minute period for solution. The granulate had very good free flowing properties and upon storage for 14 days at 40° C. showed no tendency for the particles to agglomerate.

In comparison nonporous perborate requires 6 to 7 minutes for solution. This was determined by plotting of the conductivity curve: 2 g. of the substance of the grain fraction of 0.4–0.5 mm. were dissolved in 1 liter of water at 15° C. while stirring (330 r.p.m.). To evaluate the curve the time required for solution of 95% of the perborate was selected as controlling as the remaining 5% only have a very low rate of solubility. For instance, the first 95% of perborate dust will dissolve in 3.6±0.1 min. whereas the last 5% of the dust required a further 2.4 to 3.2 minutes.

EXAMPLE 2

23.5 kg. of water per hour were added in the reaction vessel to the highly concentrated perborate solution produced according to Example 1. The perborate solution thus produced had an active oxygen content of only 6.0 wt. percent and contained 41.74 wt. percent of water (2.32 mol) more than corresponding to the formula of sodium perborate tetrahydrate. The solution was processed further as described in Example 1. It hardened in the spray tower and on the conveyor band in the same manner as the salt of Example 1 except that the proportion of dust after the drying had risen to 20 wt. percent as the granulate with a 41.75% pore volume is softer and rubs off more during the drying. 142 kg. of dry product were obtained per hour with a bulk density of 330 g./liter, an active oxygen content of 10.30 wt. percent and the period required for solution was 2½ minutes.

EXAMPLE 3

Sodium perborate dust was blown into the spray cone of the sprayed partially crystallized perborate solution of Example 1. The dust used was that which occurred during the drying of the product according to Example 1.

The dust particles were occluded by partially crystallized perborate solution or bonded to agglomerates thereby. The bulk density and solubility was not influenced by the introduction of the perborate dust and correspond to those of the product of Example 1. The recycling of the dust occurring during the drying provides a process for the production of perborate granulates without simultaneous occurrence of non-usable dust.

EXAMPLE 4

The 56° C. hot perborate solution prepared as in Example 1 was mixed in the crystallizing vessel with an equal quantity of cool perborate dust per hour. The cooling caused by the introduction of the cool perborate dust was equalized by the heat liberated by the partial crystallization so that the temperature which resulted in the vessel was about 56 to 58° C. The resulting crystal paste was sprayed in the same apparatus as used in Example 1. The end product was a hard granulate with 10.2 wt. percent of active oxygen of a bulk density of 530 g./liter. The higher bulk density occurs because the pores of the dust particles added in part draw in and are filled with the perborate solution and therefore cause the total pore volume to become smaller. Correspondingly the period required for solution was 4½ minutes.

EXAMPLE 5

The hot concentrated perborate solution produced as in Example 1 was pumped directly to the sprayer and sprayed as a crystal free solution thereby omitting the cooler and the crystallizer. An equal quantity of perborate dust wes blown into the resulting spray cone. A partial crystallization occurred in the spray cone. A hard granulate formed on the moving walls of the spray tower which after drying had a bulk density of 380 g./liter and an active oyygen content of 10.3 wt. percent. The period required for solution was 4½ minutes.

EXAMPLE 6

The crystal paste produced according to Example 1 was sprayed in big drops on a plastic-conveyor belt of 10 m. length and 1 m. width. The drops hardened slowly with liberation of heat. Afterwards the drops were scraped from the belt. The so obtained perborate-tablets were dried in a drum and sieved to particle size of 0.5 to 1 mm.

EXAMPLE 7

The crystal paste produced according to Example 1 was sprayed in big drops on a roll, coated with a plastic foil, the roll having a diameter of 3 meters. Owing to the very slow rotation speed of the roll the drops remained on the roll for 2 minutes. Within this time the particles completely hardened. They could be scraped off the roll without difficulties. The particles were dried in a drum and sieved to a particle size of 0.5 to 1 mm.

Up to now there were considerable inhibitions against the use of hot highly concentrated perborate solutions because such perborate solutions with the conventional stabilizer, i.e., a suspension of magnesium silicate, are highly instable at elevated temperatures. During the long handling period of the hot solutions much decomposition gas is formed which decreases the workability of the hot solutions. As a consequence a high content of metaborate is formed, decreasing the content of active oxygen of the product far below 10 percent and influencing the crystallization process.

It was unexpectedly found that water soluble salts of alkaline earth metals or of magnesium are far more efficient for the stabilization of hot highly concentrated perborate meltings or solutions than the known magnesium silicate. Highly concentrated solutions of perborate can now be handled practically without formation of gas or foam. Table II demonstrates the difference between the two stabilizers. Water was added to pure perborate having the formula $NaBO_2 \cdot H_2O_2 \cdot 3H_2O$ and containing 46.85% of water (a) until a water content as shown under (b), (c) and (d) of table II was reached. The material was fused at 90° C. and kept at this temperature for 30 minutes.

TABLE II.—STABILITY IN PERCENT

| Whole water content, percent | (a) 46.85 | (b) 68.8 | (c) 70.3 | (d) 79.5 |
|---|---|---|---|---|
| Stabilizer: | | | | |
| Magnesium silicate | 69.4 | 62.4 | 58.6 | 42.8 |
| Magnesium chloride | 94.8 | | 94.9 | 93.4 |

As can be seen from the table, 95% of the perborate tetrahydrate containing magnesium chloride as stabilizer are stable under the above described conditions. The stability is practically not influenced by further addition of water.

We claim:

1. In a process for the production of sprayed sodium perborate tetrahydrate with low bulk density from aqueous sodium perborate the improvement comprising the steps of spraying a highly viscous supersaturated aqueous sodium perborate solution containing 1 to 2.5 moles of water in excess of that corresponding to $$NaBO_2 \cdot H_2O_2 \cdot 3H_2O$$

inducing partial crystallization of the perborate in such solution at least by the time it is being sprayed, said perborate solution being permitted to fall to complete the crystallization of the product in the form of granules with occlusion of the water present in such solution and without substantial drying during the spraying to shape the crystal and thereafter drying such crystallized sprayed product.

2. A process according to claim 1 wherein the perborate solution is stabilized by a water soluble alkaline earth metal salt.

3. A process according to claim 2 wherein the salt is magnesium chloride.

4. A process according to claim 1 wherein the partial crystallization is carried out at a temperature between 30 and 60° C.

5. The process of claim 1 in which the partial crystallization is introduced prior to the granulation.

6. The process of claim 1 in which the partial crystallization is induced by stirring said perborate solution.

7. The process of claim 1 in which the partial crystallization is induced by introduction of finely divided sodium perborate tetrahydrate into the perborate solution prior to spraying.

References Cited

UNITED STATES PATENTS

| | | | |
|---|---|---|---|
| 1,200,739 | 10/1916 | Liebknecht | 23—60 |
| 2,380,779 | 7/1945 | Nees | 23—60 |
| 2,706,178 | 4/1955 | Young | 23—60 XR |
| 2,863,835 | 12/1958 | Goldsmith | 23—60 XR |
| 3,041,137 | 6/1962 | Youngman | 23—60 |
| 3,311,446 | 3/1967 | Kegelart | 23—60 |

FOREIGN PATENTS

| | | |
|---|---|---|
| 202,985 | 10/1924 | Germany. |
| 337,058 | 5/1921 | Germany. |
| 924,291 | 4/1963 | Great Britain. |
| 965,091 | 7/1964 | Great Britain. |
| 521,335 | 1/1956 | Canada. |

NORMAN YUDKOFF, Primary Examiner

C. P. RIBANDO, Assistant Examiner

U.S. Cl. X.R.

23—60, 300